No. 886,772. PATENTED MAY 5, 1908.
R. DODGE.
APPARATUS FOR TESTING EYES.
APPLICATION FILED JAN. 9, 1907.

2 SHEETS—SHEET 1.

Witnesses:
B. W. Glover
A. C. Ratigan

Inventor
Raymond Dodge
by Wright Brown Quinby May
Attorneys.

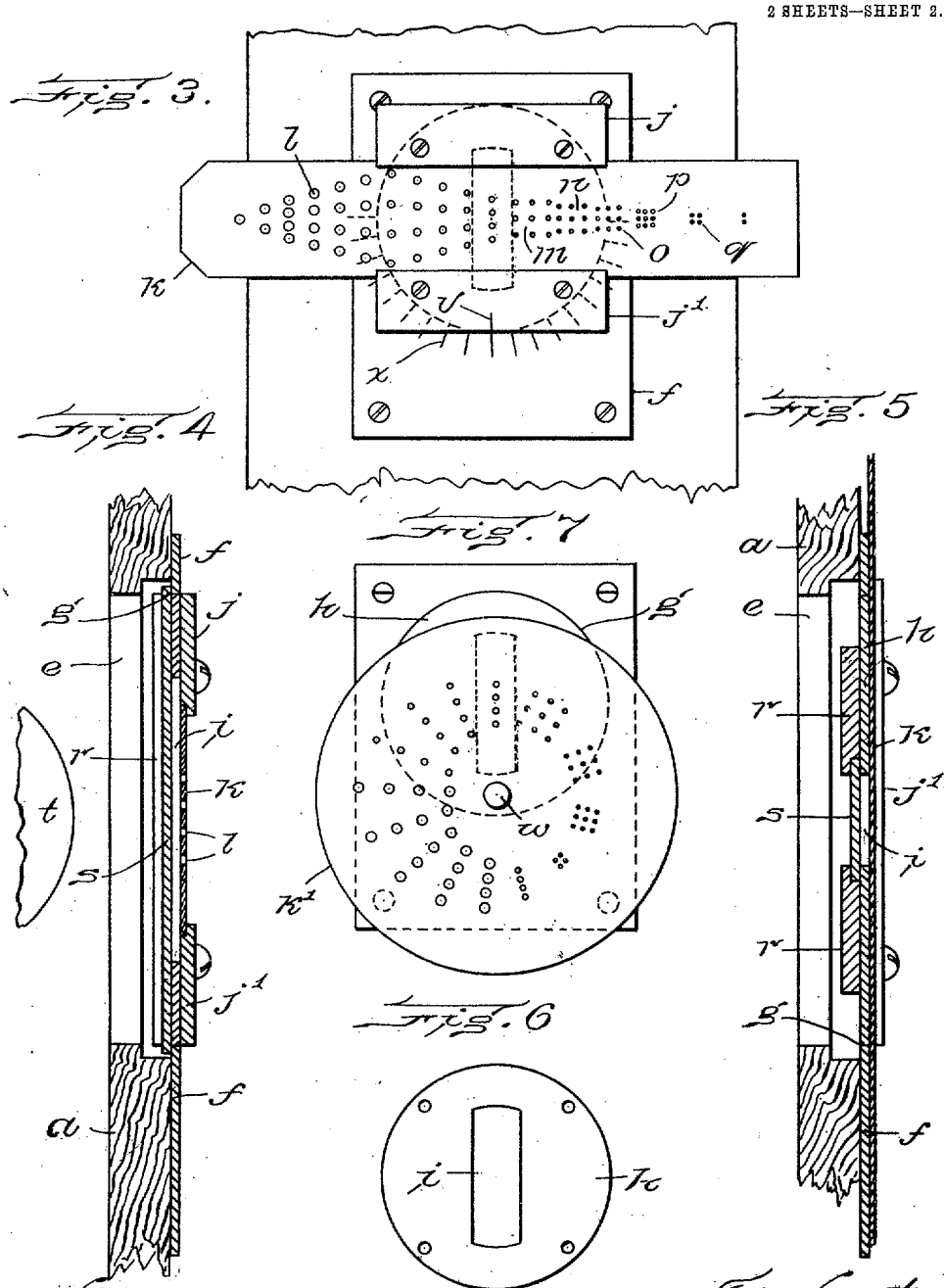

UNITED STATES PATENT OFFICE.

RAYMOND DODGE, OF MIDDLETOWN, CONNECTICUT.

APPARATUS FOR TESTING EYES.

No. 886,772.      Specification of Letters Patent.      Patented May 5, 1908.

Application filed January 9, 1907. Serial No. 351,450.

*To all whom it may concern:*

Be it known that I, RAYMOND DODGE, of Middletown, in the county of Middlesex and State of Connecticut, have invented certain new and useful Improvements in Apparatus for Testing Eyes, of which the following is a specification.

This invention consists in an apparatus by which refractive errors in eyes may be detected, and the character and amount thereof measured. Its object is first to make such an apparatus capable of detecting visual astigmatism, either simple or complex, regular or irregular, and to measure accurately its axis and the amount; also to indicate the axis of the cylindrical glass which will correct astigmatism as well as to determine the required radius of curvature of such cylindrical glass, and to serve as a test for the accuracy of the correction of visual faults by glasses which have been indicated by any test or tests whatever.

A second object is to combine in a single instrument the capability of detecting and indicating the other ametropic visual faults of myopia, hypermetropia and presbyopia, as well as of astigmatism.

Figure 1:
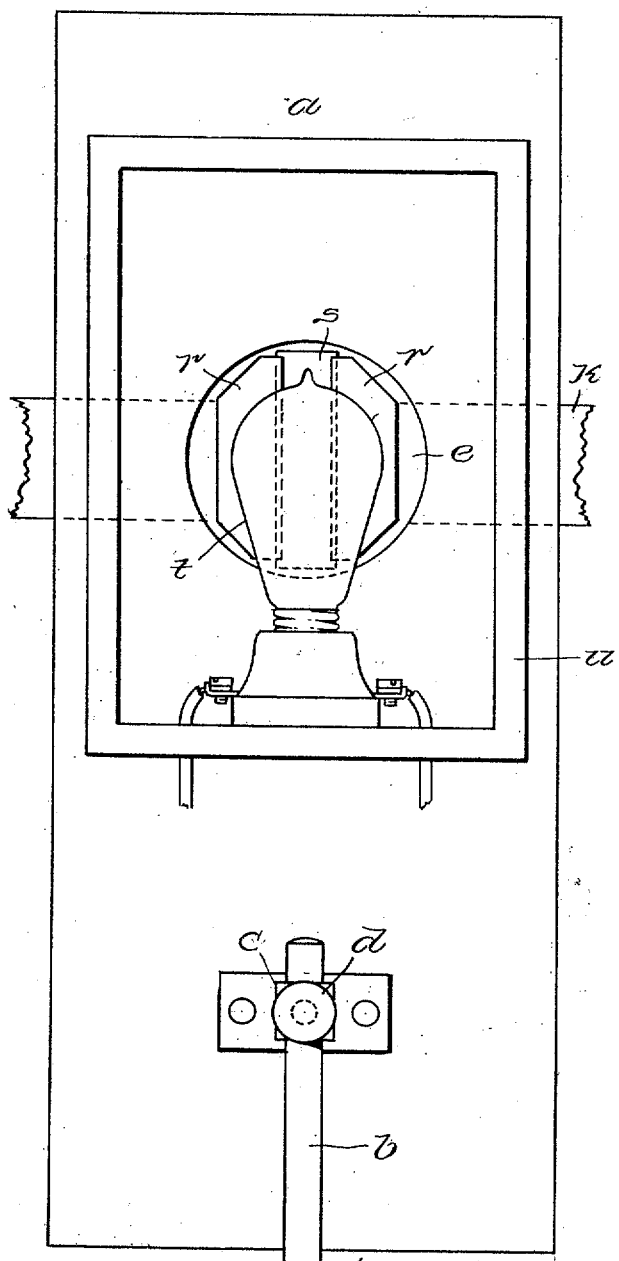
Figure 2:
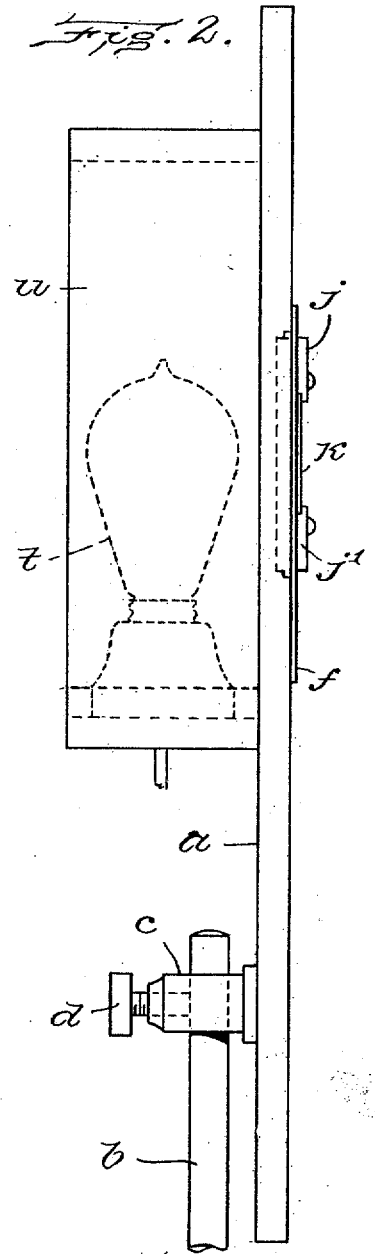

One form of apparatus by which the above objects may be attained is illustrated in the accompanying drawings, in which, Figure 1 represents a rear elevation of such a device. Fig. 2 represents a side elevation of the same. Fig. 3 represents a front elevation of the essential elements of the apparatus. Figs. 4 and 5 represent respectively, vertical and horizontal central sections of the essential elements of the apparatus, on an enlarged scale. Fig. 6 represents an elevation of the rotatable disk forming part of the apparatus. Fig. 7 represents a modification in which the same essentials shown in Fig. 3 are somewhat differently arranged.

The same reference characters indicate the same parts in all the figures.

Referring to the drawings, $a$ designates the main portion of the device, which may conveniently be made from a board or an opaque metal plate. This member is supported upon any suitable base in a convenient manner, to permit of adjustment, as by means of a rod $b$ over which a collar $c$ fixed to the member $a$ fits, and to which it is secured in any adjusted position by a set-screw $d$.

The member $a$ has an opening $e$ over which is secured a plate $f$ formed with a circular hole $g$ in which fits a circular disk $h$. The disk $h$ also has an opening $i$ in the form of a wide slit, which is in front of the opening $e$ and adapted to transmit light from the rear to the front side of the board.

On its front side, the disk, as shown in Figs. 3, 4 and 5, has secured to it guides $j$ $j'$ which hold movably an opaque screen $k$. The guides and screen together completely cover the slit $i$. In the screen $k$ are a number of apertures $l$ which are arranged in groups, each group consisting of two or more apertures. In those groups consisting of more than two, the apertures are arranged either in a single straight line or in a number of parallel straight lines, as in the case of the groups marked $m$ $n$ $o$ $p$ and $q$. In those groups consisting of single lines, the apertures are variously spaced, that is, the spacing between individual apertures of the same group is equal, but differs from the corresponding spacing in the other groups, and the sizes of the apertures of the several groups may also vary from the size of a pinhole to a diameter of some millimeters. Whatever the size of the apertures may be, however, they are always of simple form and define a continuous area without opaque obstructions within their outer edges. Preferably they are circular. In those groups consisting of more than one line of apertures, the spacing in any one group is equal, but differs from that of the other groups. The movable mounting of the screen $k$ in the guides $j$ and $j'$ is such that any group of apertures may be brought in front of the slit $i$ and viewed by the transmitted light coming through the same, and the width and length of the slit are such that any complete group of apertures may be contained within its boundaries when brought in front of it.

On the rear side of the disk $h$, which with the guides $j$ and $j'$ constitutes a screen holder, are secured holding members $r$ and $r'$ between which is contained a non-transparent but translucent screen $s$ which fully covers the slit $i$. This screen is made of some material, such as milk glass, which will permit light to pass through it, but will so diffuse and disperse the light that an equal illumination is given to all parts of the slit. Thereby all of the apertures in the opaque screen in front of the slit receive the same amount of light, even when the same proceeds from a source of varying brilliancy, as the electric light *t* shown in the drawings. This light is contained in an open casing *u* on the back of the main portion *a*. The casing is left open at the back so that sunlight or any other independent source of light may be used for the illumination instead of the lamp. The disk is retained in the plate *f* by means of the overlapping edges of the guides *j j'* and *r*, and is freely rotatable therein, having an index mark *v* by which the amount of rotation may be determined with reference to a fixed graduated scale of degrees *x* on the plate *f*.

In Fig. 7, I have shown a modification in which the screen consists of a circular disk *k'* pivoted to the disk *h* by a stud *w*. The circular screen has its apertures arranged in radial lines instead of parallel, and by rotation may bring any group of apertures in front of the slit *i*. When the disk *h* is rotated, the screen is moved with it, and that group of apertures in front of the slit *i* is caused to change its inclination in the same manner as in the other form.

In using the apparatus for the determination of astigmatism, the subject is placed at the required distance from the apparatus, and the latter is then adjusted as to height so that the line on which the group of apertures in front of the slit *i* is seen is approximately perpendicular to the plane in which the screen and its holder are rotatable.

The manner in which the apparatus is employed to detect astigmatism is as follows: While an emmetropic eye will observe the illuminated holes without distortion or material enlargement by dispersion, they will produce on the retina of the astigmatic eye more or less distorted simple images, as ellipses or bright lines, or accompanied by elongated dispersion areas, or by additional distinct images. The amount of distortion of the image and the direction in which the distortion extends, varies with different eyes, according to the amount and the axis of the astigmatism. By revolving the screen-holder and screen, the line of apertures may be brought to coincide with the direction of distortion, so that the elongated image or the dispersion area extends from one hole of the group directly toward the next one, being on the same line as the apertures, and bilaterally symmetrical to this line. This angle between the line of apertures and the horizontal will then indicate the plane of astigmatism and can be measured by the index *v* on the scale *x*. If a convex cylindrical glass is required to correct the error, it will indicate the axis thereof. If a concave cylinder is necessary, its axis will be the same angle plus or minus 90 degrees.

The apparent length of the irregular dispersion area will indicate the focal length of the cylinder required to correct it. This apparent length may be measured by using different groups of apertures of which, as before stated, the spacing varies. The screen will be shifted so as to bring different groups into the illuminated area until a group of such spacing is presented that the dispersion area, elongation, or additional image of one hole just touches the adjacent hole. The apparent distance between the holes will be the measure of the astigmatic error, as the direction of the line of holes is a measure of its axis. For any given distance between the location of the patient and the apparatus, these distances between the apertures may be indicated on the opaque screen in dioptrics and fractions of a dioptric so that the curvature of the required cylindrical lens may be read directly at the apparatus. For distances other than that for which the figures on the screen are calculated, the values indicated thereon will be proportionally changed. The same procedure that determines originally the irregularity in the dioptric apparatus of the eye will also determine any irregularity in the combined dioptric system of the eye and the corrective glass. That is, if the glass does not correct the fault of the eye, there will still be a distorted image of the apertures, and thus the degree by which the glass fails to correct the irregularity can be detected and accurately measured. Thus the apparatus serves as a test of the corrective quality of the glass as well as of the error in the eye. If the glass wholly corrects the astigmatic fault, there will be no apparent distortion of the illuminated apertures. It is not necessary, however, that two or more apertures should be observed at once, and the screen made rotatable as a whole in order to secure the results above described. It is indeed possible to use a simpler form of the apparatus in which only one aperture is employed. In Fig. 3, it will be noted that near the left-hand end of the screen is a single hole. This may be placed alone in front of the slit and the single dispersion area or elongation observed with reference to a scale either marked upon the screen or placed temporarily against, and the axis of astigmatism may be noted by a series of radiating lines making known angles with the horizontal, or by the angle at which the temporary scale is held.

The apparatus hereinbefore described serves as a more accurate test for the ametropic fault than the previously used testing devices consisting of cards with black lines or letters upon them. This is due to the fact that the illumination of holes in an opaque screen by transmitted light may be relatively much greater than that of printed lines and letters on a card by reflected light, thereby rendering apparent irregularities in the images which would pass unnoticed otherwise.

The qualitative differences of size and shape, which are observed when this apparatus is used, are more readily apprehended than the quantitative differences of clearness or blackness on which the usual tests, i. e., radiating lines or letters composed of lines, depend. Similarly, the question of whether a line of dots, together with its irregular apparent radiation errors is a straight line or a broken line, is psychologically simpler to determine than the quantitative question of which lines or letters are darker, on which the older tests depend. That is, the degree of rotation of the screen at which the dispersion areas of the apertures come into line with the apertures, can be determined with greater accuracy than it can be determined which one of a number of radiating lines is blackest.

Judgment of the shape of illuminated objects and the direction of lines is independent of the illiteracy of the subject, and thus with this apparatus an accurate test may be made of the eyes of a patient, who, by reason of his illiteracy, could not distinguish between various letters on the charts used in the previous tests.

All the tests for hypermetropia and myopia may be made by the use of this apparatus, employing holes of different sizes and various manners of grouping, and thus the same apparatus may serve for determining all the refractive errors.

The presence of myopia or hypermetropia is indicated when symmetrical diffusion areas appear to surround the apertures at the normal far point or the normal near point, respectively. The degree of myopia or hypermetropia would be indicated as in astigmatism by the actual separation of the apertures whose diffusion areas just appeared to touch. This test is much more accurate than the familiar tests with letters, not only with the illiterate, but also with those who are familiar enough with the forms of letters to name them from their general appearance of blackness, compactness, elongation, etc.

I claim:—

1. An apparatus for determining the amount and axis of visual astigmatism, consisting of an opaque screen having two or more apertures in line, provisions for illuminating the apertures from the rear, whereby the apertures may be viewed from a distance as distorted images by the astigmatic eye, the spacing of the apertures serving as a measure of the amount of astigmatism, and provisions for rotating the screen to change the angle of the line of apertures, whereby to measure the axis of astigmatism.

2. An apparatus for determining the amount and axis of visual astigmatism, consisting of an opaque screen having two or more apertures in line, provisions for illuminating the apertures from the rear, whereby the apertures may be viewed from a distance as distorted images by the astigmatic eye, the spacing of the apertures serving as a measure of the amount of astigmatism, provisions for rotating the screen to change the angle of the line of apertures, and a scale indicating the amount of rotation of the screen, whereby to measure the axis of astigmatism.

3. An apparatus for determining the amount and axis of visual astigmatism, consisting of an opaque screen having a plurality of groups of apertures, each group consisting of two or more apertures arranged in a straight line, and those of different groups having varying spacing; and provisions for independently illuminating separate groups and excluding light from the other apertures, and the screen being movable angularly to change the direction of the line of apertures.

4. An apparatus for determining the amount and axis of visual astigmatism, consisting of an opaque screen having a plurality of groups of apertures, each group consisting of two or more apertures arranged in a straight line, and those of different groups having varying spacing; provisions for independently illuminating selected groups and excluding light from other apertures, and the screen being movable angularly to change the direction of the line of apertures, and means for measuring the amount of angular displacement thereof.

5. An apparatus for the detection and measurement of visual faults, comprising an opaque screen with light-transmitting apertures, such apertures being arranged in straight-line groups with varying spacing; an opaque holder for the screen having an opening of a size sufficient to uncover any complete group of apertures, with respect to which the screen is movable so as to place any group of apertures before the opening; and a translucent screen covering the opening between the screen and the source of light, whereby the light is diffused and an equal illumination given to all the apertures in any group.

6. An apparatus for the detection and measurement of visual faults, comprising an opaque screen with light-transmitting apertures, such apertures being arranged in straight-line groups with varying spacing; and an opaque holder for the screen having an opening of a size sufficient to uncover any complete group of apertures, with respect to which the screen is movable so as to place any group of apertures before the opening; the holder being rotatable to alter the direction of the line of apertures in the screen.

7. An apparatus for detecting and measuring visual errors, comprising a main portion having an opening; an opaque disk rotatably mounted over said opening and having a slit; and an opaque screen having light-transmitting apertures, mounted on said disk movably, so that any aperture may be brought over the slit, the screen being rotatable with the disk so as to vary the inclination of the line joining any two or more apertures which are over the slit.

In testimony whereof I have affixed my signature, in presence of two witnesses.

RAYMOND DODGE.

Witnesses:
 FRANK W. ROBERTS,
 WILLIAM J. JAMES.